United States Patent [19]

Yoshimura

[11] Patent Number: 4,740,844
[45] Date of Patent: Apr. 26, 1988

[54] METHOD OF CHANGING MAGNIFICATION OF IMAGE

[75] Inventor: Tsuyoshi Yoshimura, Tokyo, Japan

[73] Assignee: Ricoh Company, Ltd., Tokyo, Japan

[21] Appl. No.: 849,801

[22] Filed: Apr. 9, 1986

[30] Foreign Application Priority Data

Apr. 19, 1985 [JP] Japan .................................. 60-84925

[51] Int. Cl.⁴ ............................................. H04H 1/04
[52] U.S. Cl. .................... 358/287; 358/283; 358/298
[58] Field of Search ............... 358/283, 287, 298, 77, 358/227

[56] References Cited

U.S. PATENT DOCUMENTS

| | | | |
|---|---|---|---|
| 3,837,743 | 9/1974 | Amemiya | 358/287 |
| 4,423,439 | 12/1983 | Watanabe | 358/287 |
| 4,424,534 | 1/1984 | Nagane | 358/287 |
| 4,496,983 | 1/1985 | Takenaka | 358/287 |
| 4,521,812 | 6/1985 | Knop | 358/287 |
| 4,633,327 | 12/1986 | Roetling | 358/283 |
| 4,651,225 | 3/1987 | Yamada | 358/287 |
| 4,679,096 | 7/1987 | Nagashima | 358/287 |
| 4,684,979 | 8/1987 | Hirosawa | 358/287 |

Primary Examiner—Edward L. Coles, Sr.
Attorney, Agent, or Firm—Oblon, Fisher, Spivak, McClelland & Maier

[57] ABSTRACT

A method of applying magnification changing processing to an image in a digital copier or the like. The processing consists of subprocessing which is effected by operating optics of a scanner, and subprocessing which is effected by space filter processing of the kind using a threshold matrix. When digital video data read by the scanner on a pixel basis and quantized with respect to multiple levels are to be binarized by the space filter processing, the size of the threshold matrix is changed to roughly change the magnification. A delicate change of magnification is performed by the operation of the optics while the scanner reads the image.

3 Claims, 6 Drawing Sheets $S_{11}\ S_{12}\ S_{13}\ S_{14}\ S_{15}\ S_{16}\ S_{17}\ S_{18}\ S_{11}$ ---
$S_{21}\ S_{22}\ S_{23}\ S_{24}\ S_{25}\ S_{26}\ S_{27}\ S_{28}\ S_{21}$ ---
$S_{31}\ S_{32}\ S_{33}\ S_{34}\ S_{35}\ S_{36}\ S_{37}\ S_{38}\ S_{31}$ ---
$S_{41}\ S_{42}\ S_{43}\ S_{44}\ S_{45}\ S_{46}\ S_{47}\ S_{48}\ S_{41}$ ---
$S_{11}\ S_{12}\ S_{13}\ S_{14}\ S_{15}\ S_{16}\ S_{17}\ S_{18}\ S_{11}$ ---

METHOD OF CHANGING MAGNIFICATION OF IMAGE

BACKGROUND OF THE INVENTION

The present invention relates to a method of changing, such as enlarging or reducing, the size of an image reproduced.

In a digital copier and other imaging equipments, a change in magnification has customarily been effected by operating optics while a scanner scans an imaged surface of a document and the resultant picture data are read on a pixel basis. Although capable of producing quality images by use of simple means, the magnification changing processing which relies on operation of optics as stated is incapable of setting up a wide range of magnifications due to severe space conditions.

Meanwhile, interpolation is well known in the art as a method which varies the magnification of an image by image processing which is based on image data read on a pixel basis. Specifically, interpolation is such that pixel data are thinned out or supplemented according to a predetermined algorithm which involves density levels of surrounding pixels. The interpolation scheme works without any problem so long as the magnification ratio is relatively small. However, where the magnification ratio relatively large, the reliability of data representative of a scanned image becomes poor with the result that the quality of a reproduced image is lowered.

In a digital copier, variable magnification is implemented by controlling a scanner section to one scanning rate and a printer section to another scanning rate. Such a variable magnification scheme, however, requires a special connection between the scanner section and the printer section, failing to win a wide range of applications.

SUMMARY OF THE INVENTION

It is therefore an object of the present invention to provide a method which is capable of varying magnification of an image over a wide range of ratios without effecting the quality of an image reproduced.

It is another object of the present invention to provide a generally improved method of changing magnification of an image.

A method of varying a magnification of an image carried on a document of the present invention comprises the steps of scanning the image of the document by a scanner to read the image on a pixel basis, while the scanner reads the image, operating optics of the scanner to vary the magnification, quantizing magnification-varied video data with respect to multiple levels to produce digital video data, binarizing the digital video data by space filter processing which uses a threshold matrix, and, during the binarizing step, changing a size of the threshold matrix to change the magnification.

In accordance with the present invention, a method of applying magnification changing processing to an image in a digital copier or the like is disclosed. The processing consists of subprocessing which is effected by operating optics of a scanner, and subprocessing which is effected by space filter processing of the kind using a threshold matrix. When digital video data read by the scanner on a pixel basis and quantized with respect to multiple levels are to be binarized by the space filter processing, the size of the threshold matrix is changed to roughly change the magnification. A delicate change of magnification is performed by the operation of the optics while the scanner reads the image.

The above and other objects, features and advantages of the present invention will become more apparent from the following detailed description taken with the accompanying drawings.

DESCRIPTION OF THE PREFERRED EMBODIMENT

While the method of changing modification of an image of the present invention is susceptible of numerous physical embodiments, depending upon the environment and requirements of use, a substantial number of the herein shown and described embodiment have been made, tested and used, and all have performed in an eminently satisfactory manner.

Figure 1:
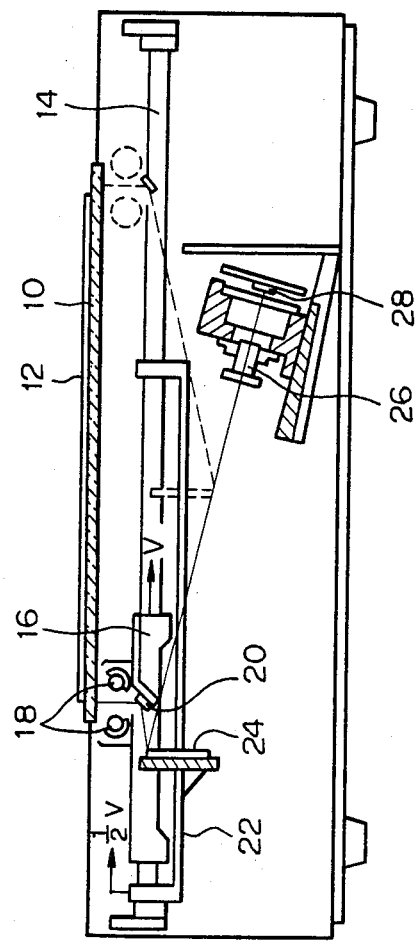
FIG. 1 is a sectional front view of a typical construction of a scanner.

Referring to FIG. 1, a typical construction of a scanner adapted to read a picture on a document is shown. A light source 18 is mounted on a first movable body 16 which is movable along a guide 14 at a velocity V in a subscanning direction and in parallel to a document, which is laid on a glass platen 10. A scanning mirror 20 is also mounted on the body 16. An optical path length compensating mirror 24 is mounted on a second movable body 22 which is movable along the guide 14 at a velocity V/2 in the subscanning direction. A lens 26 is supported by a stationary member of the scanner. While the body 16 is moved, the light source 18 sequentially illuminates the document 12 from below. Reflections from the document 12 are sequentially routed through the mirrors 20 and 24 and the lens 26 to an image sensor 28 in which charge coupled devices (CCD) or like solid-state imaging devices are arranged in an array on a pixel basis, whereby the image of the document 12 is sequentially read.

Figure 2A:
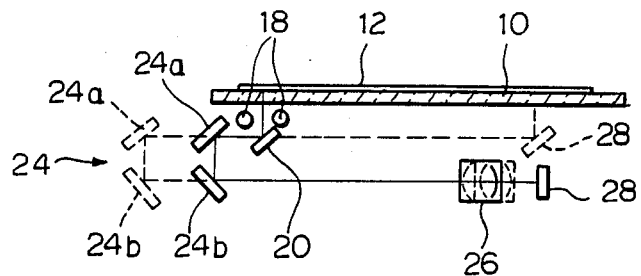
FIGS. 2A to 2C schematically show three different specific constructions for varying magnification by operating optics.
Figure 2B:
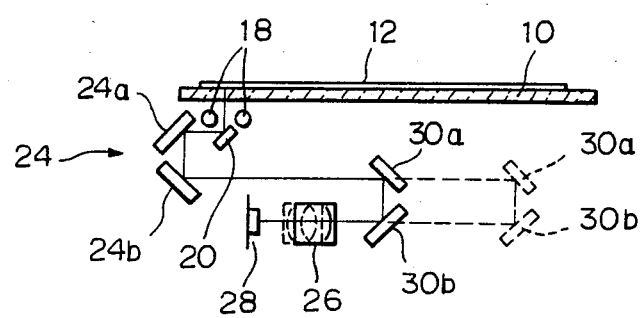
Figure 2C:
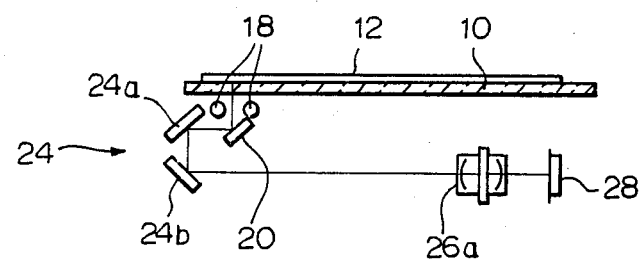

Referring to FIGS. 2A to 2C, there are shown three different specific constructions which are applicable to the scanner of FIG. 1 for varying magnification of a picture by optical processing.

In the construction shown in FIG. 2A, after a distance which sets up a desired magnification has been defined between the lens 26 and the image sensor 28, the mirror 24 adapted for compensation of the optical path (in this particular example, a pair of mirrors 24a and 24b are used) is moved to vary the length of the path between the document 12 and the lens 26 and, thereby, the magnification.

In FIG. 2B, after a distance matching with a desired magnification has been set up between the document 12 and the lens 26, a pair of mirrors 30a and 30b adapted for optical path length conversion are moved to vary the length of the path between the lens 26 and the image sensor 28 and, thereby, the magnification.

Further, in FIG. 2C, use is made of a zoom lens 26a instead of the lens 26. After a given conjugate path length has been selected, the focal length of the lens 26a is changed to set up a desired magnification.

In this manner, the magnification change which relies on operation of the optics of the scanner is performed in the main scanning direction by such optical processing as shown in any one of FIGS. 2A to 2C and in the subscanning direction by varying the running velocity of the optics relative to the document 12. It will be understood that this kind of processing allows an image to be enlarged or reduced delicately at a desired one of a limited range of magnification ratios and without disturbing data which are representative of the image, thereby offering a clear-cut image in a desired size.

Assume a case wherein an image which includes halftone, e.g., photograph is sequentially scanned line by line by a scanner. Then data representative of the image are read by a CCD or like line image sensor on a pixel basis, and then the picture data are analog-to-digital converted to quantized them with respect to multiple levels, the resultant digital video data being binarized. The reproducibility of the halftone may be enhanced by any one of known methods of the kind effecting space filter processing based on a threshold matrix which utilizes an integration effect of eyesight. In accordance with the present invention, use is made of, among those particular methods, the ordinary partial matrix method which binarizes digital data by comparing data associated with a particular pixel to be processed and one of submatrices of a threshold matrix (mother matrix).

Figure 3:
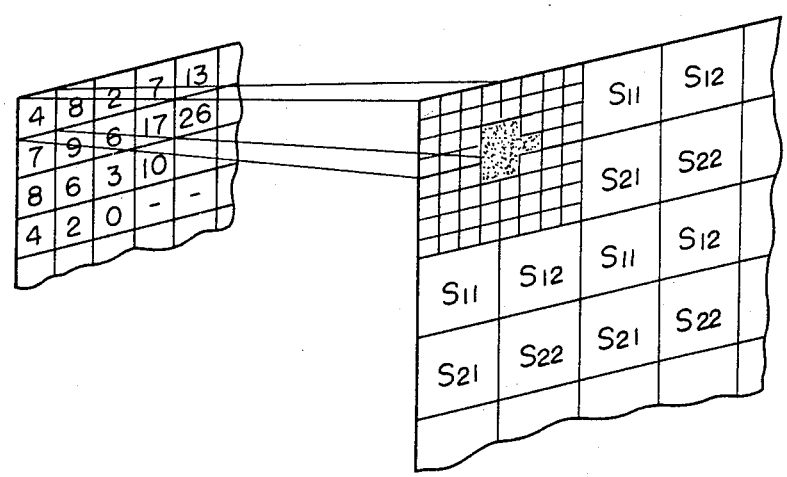
FIG. 3 shows the principle of two-level processing which is based on a partial matrix method.

Referring to FIG. 3, there is shown the principle of operation for binarizing on a pixel basis the digital video data DB which has been quantized to sixty-four tones (six bits) by the partial matrix method, by using a 4×4 submatrix SM-4 which has been cut from an 8×8 mother matrix, which is adapted to render $8^2$ tones in total.

Figure 4:
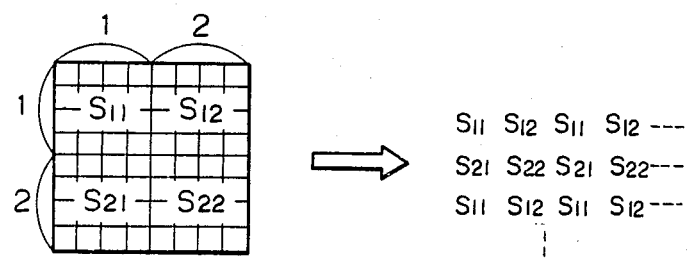
FIG. 4 shows the principle of segmentation of a mother matrix to $4 \times 4$ submatrices.

Shown in FIG. 4 is the principle of operation for cutting the 4×4 submatrix SM-4 from an 8×8 mother matrix MM which has threshold values S11 to S22.

Where the partial matrix method is adopted, the basis of gradation of digital video data is determined by the dimensions of the mother matrix; the greater the mother matrix size, the more the gradation is enhanced. Also the resolution of a binarized image is determined by the dimensions of a submatrix; the smaller the submatrix size, the greater the resolution becomes, In practice, binarization of digital video data is effected by segmenting a predetermined mother matrix to a suitable size of submatrix which prevents noise in a high frequency range from becoming significant, taking account of the above-mentioned gradation and resolution.

Assume that the image read density assigned to a scanner and the picture printout density assigned to a printer are the same, say 400 dots per inch. Then, where the printer reproduces a image based on data which are produced by binarizing digital video data which in turn are produced by the scanner by the partial matrix method using a 2×2 submatrix, a picture double in size is obtainable. Further, if the partial matrix method is of the kind using a 3×3 submatrix, a three times enlarged picture will be reproduced.

Thus, in accordance with the present invention, in the event of binarizing digital video data on a pixel basis by the partial matrix method, the size of the submatrix is changed to roughly vary the magnification of an image.

Figure 5:
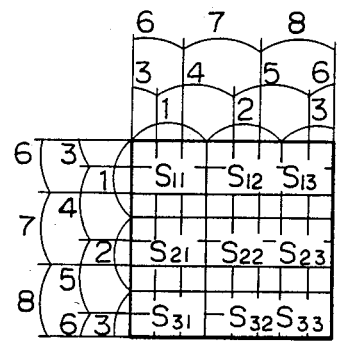
FIG. 5 shows the principle of segmentation of a mother matrix to $3 \times 3$ submatrices.

Referring to FIG. 5, the principle of segmenting an 8×8 mother matrix MM having threshold values S11 to S22 to a 3×3 submatrix SM-3 shown. It will be seen that a submatrix of any other size may be cut off from the mother matrix in the same manner. Where the printout of an image is performed using data which are binarized on a 2×2 submatrix basis, for example, an image of the same size as an original image may be reproduced by calculating a mean value of each of the binarized 2×2 pixel matrices so as to collect the pixels of each matrix into one and then printing out the image.

In the case where the partial matrix method is used to vary the size of an image to be reproduced, the quality of image reproduction is enhanced because the partial matrix method is originally elaborated to enhance gradation and sharpness of images. Hence, the size of an image can be varied over a wide range and, yet, to details thereof by delicately changing the magnification through the previously stated operation of the optics, which occurs in the event when the scanner reads a document image, and then roughly changing it by suitably changing the dimensions of the submatrix in the event when multi-level quantized digital video data representative of the document image are binarized by the partial matrix method.

For example, if a 2×2 submatrix is used in combination with a magnification range of 50% (reduced to ½) to 100% (equal size) which is variable by every 1% by the operation of the optics, it is possible to vary the magnification of an image by every 2% over the range of 100% to 200%. Likewise, if a 3×3 submatrix is used, the magnification is variable by each 3% over the range of 150% to 300%. Further, where a 4×4 submatrix is used, the magnification is variable by each 4% over the range of 200% to 400%. Conversely, reducing the submatrix size would make it possible to reduce the image size.

In accordance with the present invention, in the event when the size of the submatrix which is cut from the mother matrix is changed to vary the magnification, particularly the vertical and horizontal dimensions of the submatrix may be selected independently of each other in order to vary the vertical and horizontal magnifications independently of each other. For example, where an image is to be reproduced in at a magnification of 100% in the vertical direction and at a magnification of 125% in the horizontal direction, a 4 (vertical)×5 (horizontal) submatrix may be cut from the mother matrix to binarize digital video data using that particular submatrix. In this situation, if the scanner, too, is provided with means for varying magnifications in the main and subscanning directions independently of each other during operation of the optics, the magnifications in the vertical and horizontal directions can be varied independently of each other over a considerably wide range and to minute details.

The present invention may be practiced with the density pattern method, instead of the partial matrix method shown and described. In this case, too, the size of a threshold matrix may be suitably varied to roughly change the magnification of an image over a substantial range. Specifically, the density pattern method uses matrices which correspond one to each tone level of multi-level quantized digital video data, so that a two-level pattern of a matrix which matches with a particular tone level of an input pixel may be outputted; as in the case of the partial matrix method, a two-level picture is reproduced with each input pixel represented by a pixel area having pixels the number of which is dictated by the size of a threshold matrix.

Figure 6:
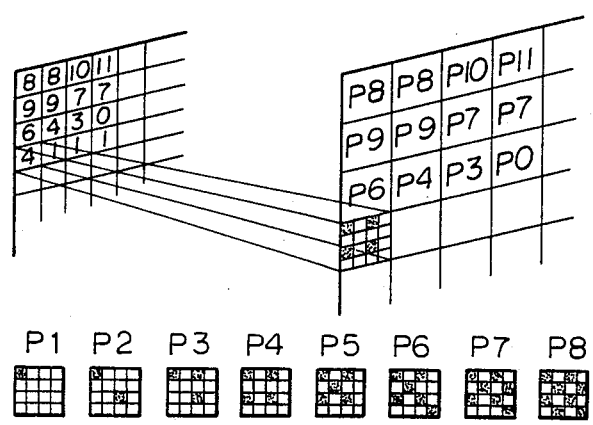
FIG. 6 shows the principle of two-level processing which is based on a density pattern method.

Referring to FIG. 6, there is shown a manner of binarizing by the density pattern method the digital video data DB which have been multi-level quantized on a pixel basis. In the case of the density pattern method, a change in the size of a matrix entails a change in the number of tone levels and, therefore, the effect of a reproduced picture varies from one magnification to another. In contrast, in the partial matrix method, even if the size of a submatrix is changed, the gradation is solely dependent on the mother matrix so long as the submatrix size does not exceed the mother matrix size. That is, the partial matrix method maintains the same gradation despite any change in magnification. In any case, however, because a distortion-free clear-cut picture whose magnification has been varied by the optics is subjected to a magnification change which relies on space filter processing, a high-quality clear-cut image is attainable over a wide range of magnifications.

Figure 7:
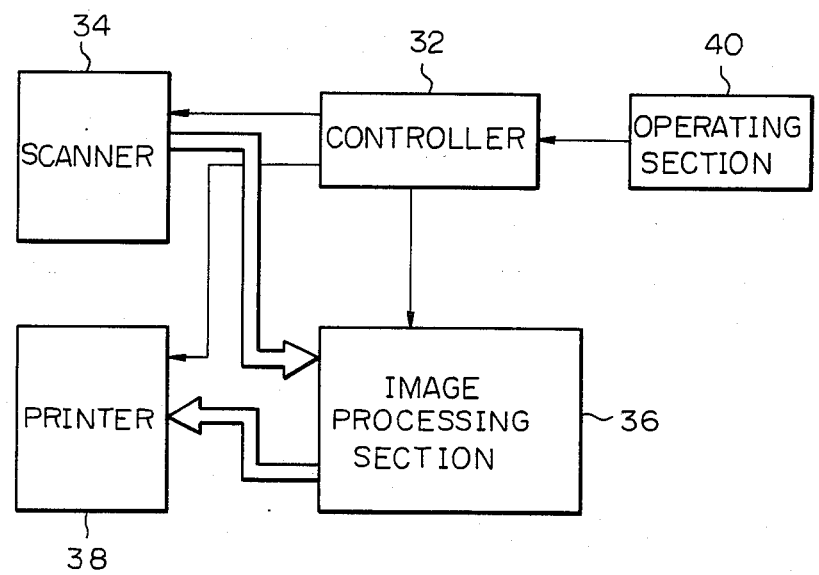
FIG. 7 is a block diagram showing a specific system construction for embodying the present invention.

Referring to FIG. 7, an exemplary system construction of a digital copier for practicing the method of the present invention is shown. Controlled by a controller 32, an image processing section 36 reads multi-level quantized digital video data which are delivered from a scanner 34 and applies predetermined image processing (inclusive of magnification change) to the video data. The resltant two-level data are fed to a printer 38 to reproduce an image. The controller 32 responds to a magnification instruction applied thereto from an operating section 40 by conditioning the optics of the scanner 34 such that a desired magnification is set up by the optics. The controller 32 further fulfills the role of notifying the image processing section 36 of a size of threshold matrix such that a predetermined magnification is set up by the space filter processing.

Figure 8:
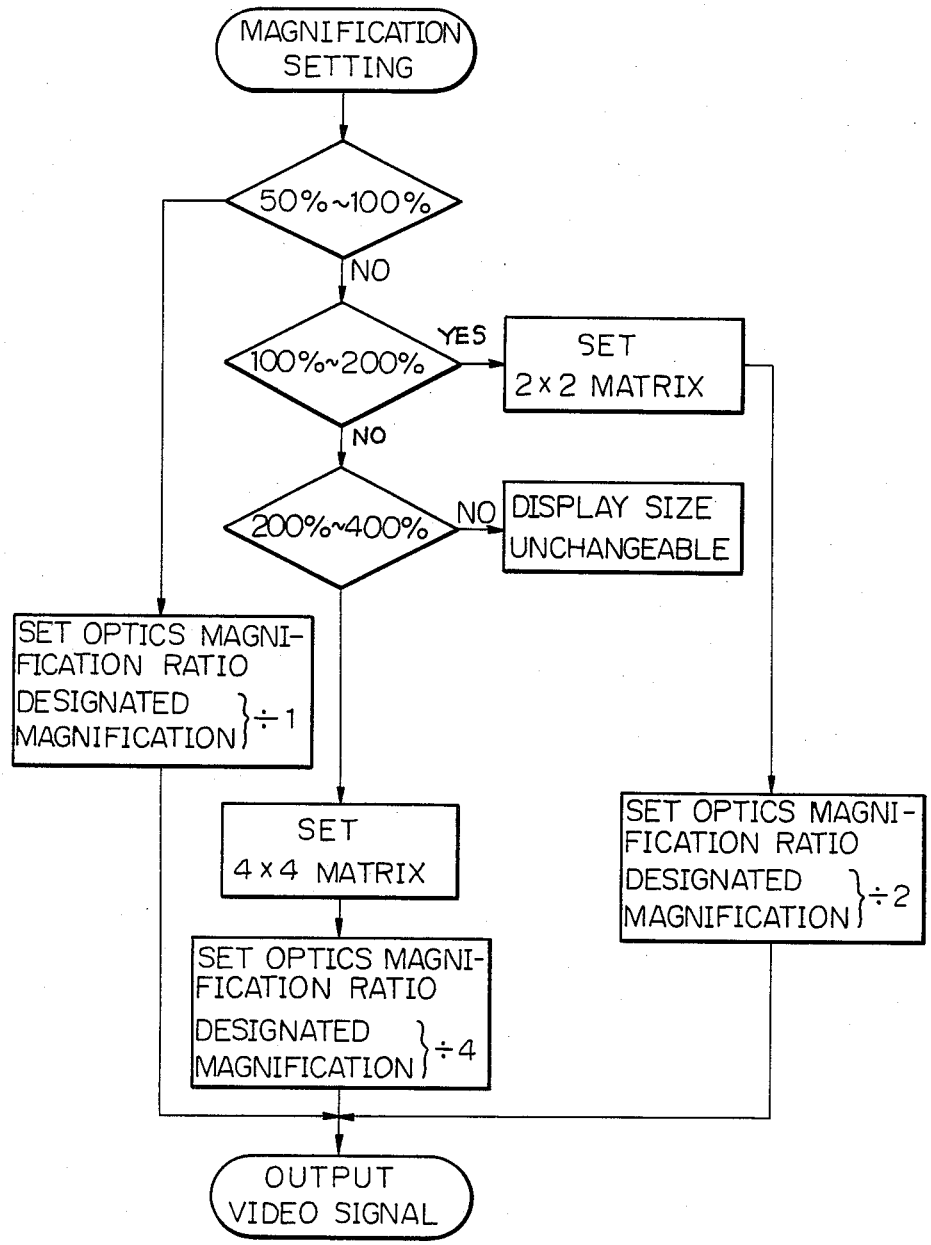
FIG. 8 is a flowchart demonstrating an exemplary operation which a controller included in the system of FIG. 8 may perform at the time of a magnification change.

Referring to FIG. 8, a control flow performed by the controller 32 in the event of a magnification change is shown. Because the described type of system is commonly and essentially furnished with the image processing section 36, what is required is simply preparing a plurality of matrices of different sizes and allowing the matrices to be selected one at a time responsive to a command from the controller 32. Such ensures a wide variety of applications without posing any restriction on the whole system.

In summary, it will be seen that the present invention provides a method capable of varying the magnification of an image over a wide range without lowering the quality of an image reproduced.

Various modifications will become possible for those skilled in the art after receiving the teachings of the present disclosure without departing from the scope thereof.

What is claimed is:

1. A method of varying a magnification of an image carried on a document, comprising the steps of:
   (a) scanning the image of the document by a scanner to read the image on a pixel basis;
   (b) while the scanner reads the image, operating optics of the scanner to vary the magnification;
   (c) quantizing magnification-varied video data with respect to multiple levels to produce digital video data;
   (d) binarizing the digital video data by space filter processing which uses a threshold matrix; and
   (e) during the binarizing step, changing a size of the threshold matrix to change the magnification.

2. A method as claimed in claim 1, wherein the space filter processing in step (d) uses a partial matrix method.

3. A method as claimed in claim 1, wherein the space filter processing in step (d) uses a density pattern method.

* * * * *